Patented July 28, 1953

2,647,093

UNITED STATES PATENT OFFICE 2,647,093

METHYL METHACRYLATE-MODIFIED OIL ALKYD

Carl J. Opp and Raymond E. Werner, Cincinnati, Ohio, assignors to Interchemical Corporation, New York, N. Y., a corporation of Ohio No Drawing. Application July 12, 1951, Serial No. 236,479

4 Claims. (Cl. 260—22)

This invention relates to the preparation of modified alkyd resins.

Modified alkyd resins are among the most versatile of all resin types and many have found great commercial utility. Among the most useful of the modified alkyds, are the drying oil-modified alkyds and the non-drying oil-modified alkyds. Incorporation of 25 per cent or more of such oils or the fatty acids from such oils into alkyds overcomes the inherent brittleness of the pure alkyd and gives a resin suitable for use in protective and decorative finishes. One such use for oil-modified alkyds is in blends with Beetle type resins such as urea-formaldehyde and melamine formaldehyde resins for use as baking enamels. Advantages obtained are increased hardness and mar resistance and the finish may be baked at high temperatures without danger of discoloration.

The present invention has as one of its main objects the production of a novel type of modified alkyd resin particularly characterized by containing relatively large amounts of copolymerized methyl methacrylate. These modified alkyds are particularly characterized by being readily compatible with urea-formaldehyde and melamine-formaldehyde resins. This property of the novel resins makes them particularly useful in the preparation of protective and decorative coatings.

The modified alkyds of our invention are prepared by first heating a mixture of methyl methacrylate monomer with the desired proportion of drying oil, or drying oil acid, i. e. a conjugated unsaturated high molecular weight carboxylic acid, especially dehydrated castor oil acid, or dehydrated castor oil, in the presence of a peroxide catalyst and an alkyl mercaptan having at least four carbon atoms according to the procedure covered by our copending application, Serial Number 713,932, filed December 4, 1946, to form a methyl methacrylate fatty oil acid or drying oil copolymer.

This copolymer is then converted to a partial ester by methods known to the art as, for instance, cooking with sufficient polyhydric alcohol, in the presence of an alkaline catalyst such as calcium oxide, to form approximately the mono-ester of the alcohol with the fatty acid groups in the copolymer. The partial ester is then esterified with an organic polybasic acid or anhydride to form the alkyd. When methyl methacrylate-drying oil copolymer (compound-triglyceride) is used, it will of course, be necessary to convert the copolymer to a partial ester by alcoholysis of the ester with polyhydroxy alcohol before an alkyd can be formed. When a methyl methacrylate-drying oil acid copolymer such as methyl methacrylate-dehydrated castor oil acids copolymer is employed in the process of our invention it will be necessary to use a larger amount of polyhydroxy alcohol than is necessary when the triglyceride esters are used. In such cases the polyhydroxy alcohol may be esterified with the methyl methacrylate acid copolymer to form the partial ester, and then the partial ester may be cooked with polybasic acid to form an alkyd resin, or the methyl methacrylate acid copolymer may be cooked with the polyhydric alcohol and polybasic acid in one cook. It will be obvious to those skilled in the art of preparing fatty acid modified alkyds that the particular procedure used to prepare alkyds according to our invention may vary from one preparation to another and will depend for the most part on the particular starting materials employed. Essentially, however, the process will be the same after the partial ester of the methyl methacrylate fatty oil acid copolymer has been obtained.

We know of no limitations on the ratio of methyl methacrylate copolymer and polyhydric alcohol and polybasic carboxylic acid which may be reacted to give the novel products of our invention. Hence the ratios of the various reactants used will be governed by the properties which will be desired in the alkyd. To those experienced in the art of cooking alkyd resin it will be obvious that our process can be used to prepare alkyd resins having a wide variety of properties. For example, large ratios of a 60:40 methyl methacrylate dehydrated castor oil copolymer would tend to give an alkyd having more pronounced properties resulting from methyl methacrylate copolymer than an alkyd containing small ratios of the methyl methacrylate copolymer.

The alkyd portion of our resins may be formed from any of the commonly used polyhydric alcohols and polybasic carboxylic acids. Polyhydric alcohols such as ethylene glycol, diethylene glycol, glycerol or pentaerythritol are preferred because they are more readily available than other polyhydroxy alcohols, such as, mannitol sorbitol, and the like. Similarly, such readily available polybasic carboxylic acids as phthalic, citric, maleic, fumaric, sebasic, azelaic, adipic, itaconic and Petrex acids (Hercules Powder Co.) are preferred to other less readily available acids. Petrex acids is the trade name of a condensation product of maleic anhydride and terpene.

The invention will be more fully understood by reference to several particular embodiments of the invention as shown in the following examples, in which the parts are by weight.

Example I

To 900 parts of dehydrated castor oil heated to 350° F. was added 600 parts of methyl methacrylate, about 15 parts of t-butyl mercaptan and about 15 parts of t-butyl hydroperoxide, by means of a dropping funnel which extended below the liquid surface and at such a rate as to maintain a good reflux. While the mixture was continuously stirred under reflux the temperature was gradually raised to 500° F. to complete the copolymerization. The total cooking time was 10 hours. To 1320 parts of this 40–60 methyl methacrylate-dehydrated castor oil copolymer was added to 180 parts of glycerine and 0.2 part of calcium oxide and the mixture cooked to form a partial ester. The resulting partial ester was cooked with 415 parts of phthalic anhydride and 45 parts of glycerine to form an alkyd. Total cooking time was 6 hours. The clear, homogeneous alkyd product, when reduced to 60% total non-volatile constituents with xylol, had a viscosity of about 4.5 poises. The resin can be formulated with pigment and Beetle type resins to give baking enamels.

Example II

In a manner similar to that of Example I a 30:70 methyl methacrylate-dehydrated castor oil copolymer was prepared from 1050 parts dehydrated castor oil, 450 parts methyl methacrylate, 12 parts t-butyl mercaptan and 12 parts t-butyl hydroperoxide. The yield of clear copolymer was 1450 parts having a viscosity of about 32 poises. In similar manner to Example I this copolymer is made into an alkyd resin by first converting it to the partial ester with polyhydric alcohol (e. g. glycerol) and alkaline catalyst, and then reacting the partial ester with polycarboxylic acid, such as phthalic, maleic, or fumaric acids. The alkyd resin produced can be used to produce hard, tough, and chemical resistant finishes. Also, since the alkyd is compatible with urea-formaldehyde and melamine-formaldehyde resins, it can be formulated with these resins to give clear hard finishes.

Example III

A 50:50 copolymer of dehydrated castor oil and methyl methacrylate was prepared from 750 parts of dehydrated castor oil, 750 parts of methyl methacrylate, 19 parts of t-butyl mercaptan and 19 parts t-butyl hydroperoxide, by the same procedure as in Example I. Cooking time for this copolymer was 15 hours; the yield was 1300 parts of clear product having a viscosity of about 125 poises. The copolymer was converted to an alkyd which was compatible with melamine and urea-formaldehyde resin by a procedure similar to that of Example I.

Example IV

An 80:20 dehydrated castor oil methyl methacrylate copolymer was prepared from 1200 parts of dehydrated castor oil, 300 parts of methyl methacrylate, 25 parts of t-butyl mercaptan and 25 parts of t-butyl hydroperoxide by a procedure similar to that of Example I. The total cooking time was 7 hours and the product was clear, indicating that the oil and methyl methacrylate had combined. The copolymer was cooked into an alkyd resin by first converting it to the partial ester with glycerol in the presence of an alkaline catalyst and then reacting the partial ester with polycarboxylic acid. The resulting alkyd was compatible with urea-formaldehyde and melamine-formaldehyde resin.

Example V

A 60:40 dehydrated castor oil acids-methyl methacrylate copolymer was prepared by adding 600 parts methyl methacrylate, 12 parts t-butyl mercaptan, and 16 parts t-butyl hydroperoxide to 900 parts of dehydrated castor oil acids heated to 300° F. under reflux. The temperature of the mixture was gradually raised to 500° F. to complete the copolymerization. Total cooking time was 16 hours to obtain 1460 parts of a product which was slightly hazy at room temperature, had a viscosity of 23 poises, and an acid number of 124. To convert this copolymer into an alkyd, it is not necessary to go through the alcoholysis step as with the oil copolymers. For instance, an alkyd formulated to contain 38% dehydrated castor oil acid and 25% methyl methacrylate and having a COOH to OH ratio of 5:7 would be prepared as follows: Heat 630 parts of the 60:40 dehydrated castor oil acid-methyl methacrylate copolymer (prepared as above), 175 parts glycerol, 195 parts phthalic anhydride, and 666 parts of xylol in an inert atmosphere (e. g. $CO_2$) at 450° F., with agitation. Heating is continued until the desired acid number is obtained, preferably 12 or less based on solids. The alkyd resin is compatible with urea-formaldehyde and melamine-formaldehyde resin to give clear, hard, chemical resistant coatings.

This application is a continuation-in-part of our copending application Serial No. 713,932, filed December 4, 1946, now Patent No. 2,560,592.

It will be understood that while we have described herein certain specific embodiments of our invention, it is not intended that we limit ourselves to such specific embodiments but rather that we are to be limited only by the conditions within the scope of the appended claims.

We claim:

1. An alkyd resin comprising the reaction product of a partial ester and a polybasic carboxylic acid wherein the said partial ester is a polyhydric alcohol partially esterified with the conjoint polymerization product of methyl methacrylate with a conjugated ethylenically unsaturated fatty oil acid in the presence of a peroxide catalyst and an alkyl mercaptan having at least four carbon atoms, such alkyd resin being compatible with urea-formaldehyde resins.

2. An alkyd resin comprising the reaction product of a partial ester and a polybasic carboxylic acid wherein the said partial ester is a polyhydric alcohol partially esterified with the conjoint polymerization product of methyl methacrylate with dehydrated castor oil fatty acid in the presence of a peroxide catalyst and an alkyl mercaptan having at least four carbon atoms, such alkyd resin being compatible with urea-formaldehyde and melamine formaldehyde resins.

3. A method for preparing an alkyd resin comprising heating at esterification temperatures a partial ester with a polybasic carboxylic acid wherein the said partial ester is a polyhydric alcohol partially esterified with the conjoint polymerization product of methyl methacrylate with a conjugated ethylenically unsaturated fatty oil acid in the presence of a peroxide catalyst and an alkyl mercaptan having at least four carbon atoms, such alkyd resin being compatible with urea-formaldehyde and melamine-formaldehyde resins.

4. A method for preparing an alkyd resin comprising heating at esterification temperatures a partial ester with a polybasic carboxylic acid wherein the said partial ester is a polyhydric alcohol partially esterified with the conjoint polymerization product of methyl methacrylate with dehydrated castor oil fatty acid in the presence of a peroxide catalyst and an alkyl mercaptan having at least four carbon atoms, such alkyd resin being compatible with urea-formaldehyde and melamine-formaldehyde resins.

CARL J. OPP.
RAYMOND E. WERNER.

References Cited in the file of this patent

UNITED STATES PATENTS

| Number | Name | Date |
|---|---|---|
| 2,466,800 | Fisk | Apr. 12, 1949 |
| 2,574,753 | Opp et al. | Nov. 13, 1951 |